US011909626B1

(12) United States Patent
Tajmajer et al.

(10) Patent No.: US 11,909,626 B1
(45) Date of Patent: Feb. 20, 2024

(54) IDENTIFYING SWITCHABLE ELEMENTS TO ISOLATE A LOCATION FROM SOURCES

(71) Applicant: Bentley Systems, Incorporated, Exton, PA (US)

(72) Inventors: Michael Tajmajer, Austin, TX (US); Michael Carlisle, Austin, TX (US); Alfredo Contreras, Helotes, TX (US)

(73) Assignee: Bentley Systems, Incorporated, Exton, PA (US)

(*) Notice: Subject to any disclaimer, the term of this patent is extended or adjusted under 35 U.S.C. 154(b) by 58 days.

(21) Appl. No.: 17/587,833

(22) Filed: Jan. 28, 2022

(51) Int. Cl.
*H04L 45/122* (2022.01)
*H04L 45/00* (2022.01)
*H04L 45/42* (2022.01)

(52) U.S. Cl.
CPC ............ *H04L 45/122* (2013.01); *H04L 45/38* (2013.01); *H04L 45/42* (2013.01); *H04L 45/56* (2013.01)

(58) Field of Classification Search
CPC ....... H04L 45/122; H04L 45/38; H04L 45/42; H04L 45/56
See application file for complete search history.

(56) References Cited

U.S. PATENT DOCUMENTS

| | | | | |
|---|---|---|---|---|
| 2004/0163705 A1* | 8/2004 | Uhler | ................... | G01F 15/003 137/79 |
| 2006/0174707 A1* | 8/2006 | Zhang | ................. | G01N 29/222 700/282 |
| 2009/0022489 A1* | 1/2009 | Way | .................... | H04J 14/0291 398/4 |
| 2013/0030577 A1* | 1/2013 | Jarrell | ..................... | F17D 5/005 700/282 |
| 2016/0336623 A1* | 11/2016 | Nayar | .................. | H02J 7/0068 |

OTHER PUBLICATIONS

Bentley OpenUtilities Connect Edition Help: dated May 29, 2019: (Year: 2019).*
Ahuja, Ravindra K., et al., "Some Recent Advances in Network Flows," Society for Industrial and Applied Mathematics, SIAM Review, vol. 33, No. 2, Jun. 1991, pp. 175-219.

(Continued)

*Primary Examiner* — Chris Parry
*Assistant Examiner* — Dixon F Dabipi
(74) *Attorney, Agent, or Firm* — Cesari and McKenna, LLP; James A. Blanchette

(57) ABSTRACT

In example embodiments, a shortest path first-based isolation trace function is provided to determines what switchable elements need to be closed to stop flow of a quality to a location in an infrastructure model arranged as a network. The shortest path first-based isolation trace function may perform shortest-path traces from the location to each source. For each successful shortest-path trace finding one or more switchable elements, the first switchable element encountered on the path of the trace is added to a solution set, and marked as active to prevent further traversal in subsequent shortest-path traces. When all the shortest-path traces are complete, the solution set may be returned as a result. If no switchable element is found on a path of one of the shortest-path traces, it may be concluded that the location cannot be isolated and such conclusion returned as the result instead of the solution set.

25 Claims, 10 Drawing Sheets

(56) References Cited

OTHER PUBLICATIONS

Allen, Michael, et al., "Real-Time In-Network Distribution System Monitoring to Improve Operational Efficiency," Wiley, Journal American Water Works Association (Journal AWWA), vol. 103, No. 7, Jul. 2011, pp. 63-75.

"Bentley OpenUtilities Connect Edition Help: Network Trace," Bentley Systems, Incorporated, Retrieved from the Internet: <https://docs.bentley.com/LiveContent/web/Bentley%20Utilities%20Designer-v3/en/GUID-288FAFD8-1107-4FCB-9843-8BECC9099A06.html>, May 29, 2019, pp. 1-22.

Dutta, Amitava, "Business Planning for Network Services: A Systems Thinking Approach," Informs, Information Systems Research, vol. 12, No. 3, Sep. 2001, pp. 260-285.

Hayes, Brian, "Computing Science: On the Threshold," Sigma Xi, The Scientific Research Honor Society, American Scientist, vol. 91, No. 1, Jan.-Feb. 2003, pp. 12-17.

"Isolation Trace," Bentley Systems, Incorporated, Retrieved from the Internet: <https://docs.bentley.com/ LiveContent/web/Bentley Utilities Designer-v3/en/GUID-E602CB6B-695B-4847-9DC3-F9E78C3CFD71.html>, May 29, 2019, one page.

Mesloh, Nick, et al., "Integrated Failure Detection and Management for the Space Station Freedom External Active Thermal Control System," SAE International, SAE Transactions, Journal of Aerospace, vol. 102, Section 1, No. 932149, Jul. 1, 1993, pp. 1012-1017.

Myrick, H. Nugent, et al., "Considerations in the Isolation and Measurement of Organic Refractories in Water," Wiley, Journal American Water Works Association, vol. 55, No. 6, Jun. 1963, pp. 783-796.

Powers, Chuck, et al., "Using Existing Multiplex Communication Technology to Implement an Electric Vehicle Communication Network," SAE International, SAE Transactions, Journal of Passenger Cars, Part 2, vol. 104, Section 6, No. 951887, Aug. 1, 1995, pp. 2601-2612.

"Trace Utility Networks," ESRI, ArcGIS, ArcGIS Pro, ArcGIS Pro 2.9, Retrieved from the Internet: <https://pro.arcgis.com/en/pro-app/latest/help/data/utility-network/about-tracing-utility-networks.htm>, Nov. 11, 2021, pp. 1-3.

Tuertscher, Phillip, et al., "Justification and Interlaced Knowledge at Atlas, CERN," Informs, Organization Science, vol. 25, No. 6, Nov.-Dec. 2014, pp. 1579-1608.

"Utility Networks," ESRI, ArcGIS, ArcGIS Pro, ArcGIS Pro 2.9, Retrieved from the Internet: <https://pro.arcgis.com/en/pro-app/latest/help/data/utility-network/utility-network-trace-types.htm>, Nov. 11, 2021, pp. 1-8.

Vogt, L., et al., "A Tabu Search Algorithm for the Single Vehicle Routing Allocation Problem," Operational Research Society ltd., Journal of the Operational Research Society, vol. 58, No. 4, Apr. 2007, pp. 467-480.

Walsham, Geoff, et al., "Gis For District-Level Administration in India: Problems and Opportunities," Management Information Systems Research Center, University of Minnesota, MIS Quarterly, Special Issue, vol. 23, No. 1, Mar. 1999, pp. 39-65.

* cited by examiner

IDENTIFYING SWITCHABLE ELEMENTS TO ISOLATE A LOCATION FROM SOURCES

BACKGROUND

Technical Field

The present disclosure relates generally to infrastructure modeling, and more specifically to improved techniques for identifying switchable elements to isolate a location from sources in an infrastructure model arranged as a network (e.g., a mesh network).

Background Information

In the design, construction and/or operation of infrastructure (e.g., buildings, bridges, dams, power and industrial plants, utility networks, etc.) it is often desirable to create infrastructure models. An infrastructure model may maintain a built infrastructure model (BIM) or digital twin of infrastructure. A BIM is a digital representation of infrastructure as it should be built, providing a mechanism for visualization and collaboration. A digital twin is a digital representation of infrastructure as it is actually built, and is often synchronized with information representing current status, working conditions, position or other qualities.

Some infrastructure models may be arranged as a network having elements connected by links. For example, a model of a utility system, such as an electrical grid, water distribution system, wastewater collection system, petroleum distribution system, communications system, etc., may be arranged as network having elements connected by links. The elements may include sources that provides a quality and the elements may include switchable elements that can be opened or closed to prevent traversal of the quality. Depending on the type of utility system, the quality, sources, switchable elements and links may take different forms. For example, in an electrical system, the quality may be electricity, a source may be a power station, a switchable element may be a switch, and a link may be a wire. Likewise, in a water distribution system, the quality may be drinking water, a source may be a pumping station, a switchable element may be a valve and a link may be a pipe. Various types of networks may be employed, including mesh networks. As used herein, the term "mesh network" refers to an architecture in which at least some elements are connected by redundant paths (e.g., single links or sets of links) such that in the case of an element or link failing there may still be a path between remaining elements. Mesh network are commonly used with utility systems to provide resilience and minimize unwanted outages.

It may be desirable to perform network traces on an infrastructure model arranged as a network (e.g., a mesh network). In general, network traces analyze the interconnection of elements to determine characteristics of the network, include finding elements that are connected, finding common ancestors, finding loops, determining upstream paths towards sources, determining downstream paths away from sources, etc. One specific type of network trace is an isolation trace. An isolation trace determines what switchable elements need to be closed to stop flow of a quality (e.g., electricity, water, petroleum, communications data flow, etc.) to a location in the network (e.g., a starting element). In the case where the infrastructure model is a digital twin, such an isolation trace may be used to determine how to isolate the location so that workers can safely perform maintenance or repair tasks in the real world.

Infrastructure modeling software applications have traditionally used various methodologies to perform isolation traces on infrastructure models arranged as networks (e.g., mesh networks). One commonly used methodology involves a depth first traversal of the network to discover all the switchable elements connected to a location. A depth first traversal to discover switchable elements involves going as deep in the network as possible from the location until a switchable element (or source) is reached, backtracking towards the location to find alternative paths, and then proceeding along down such alternative paths until a switchable element (or a source) is reached, repeating until all alternative paths are explored. Each time a switchable element is reached, it is added to a solution set, which is returned as a result of the depth first traversal-based isolation trace. If a source is ever encountered, it is concluded the location cannot be isolated.

While a methodology that involves a depth first traversal of the network (e.g., mesh network) may be usable for an isolation trace, it generally suffers shortcomings. Foremost is that a depth first traversal-based isolation trace may return a sub-optimal solution, for example, a solution that includes more switchable elements than an optimal solution, or switchable elements that are more remote from each other than an optimal solution. FIG. 1A is an illustration of results of a depth first traversal-based isolation trace in an example infrastructure model arranged as a network (e.g., a mesh network). In this example, the location to isolate is node 110 from a quality flowing from source 150. A depth first traversal-based isolation trace may return a result of switchable elements 120, 130, 140. However, as may be readily observed, this result is sub-optimal, including extra switchable elements. An optimal solution includes only switchable element 140 (the other two switchable elements being redundant for isolation purposes).

Sub-optimal solutions returned by depth first traversal-based isolation trace functions may cause a number of issues. In a case where the infrastructure model is a digital twin and the isolation trace is being used to determine how workers can safely perform maintenance or repair tasks on real-world infrastructure, a suboptimal solution may consume extra worker time, causing them travel to and actuate more devices (e.g., physical switches, valves, etc.) than necessary. In a case where the infrastructure model is a BIM of to-be-built infrastructure, and the isolation trace is being used for simulation purposes, a suboptimal solution may still lead to consumption of extra computational resources (e.g., processor and memory resources) by adding extra complexity not present in a more optimal solution.

Accordingly, there is a need for improved techniques to identify switchable elements to isolate a location from sources in an infrastructure model arranged as a network (e.g., a mesh network).

SUMMARY

In example embodiments, a shortest path first-based isolation trace function is provided to determines what switchable elements need to be closed to stop flow of a quality (e.g., electricity, water, petroleum, communications data flow, etc.) to a location (e.g., a starting element) in an infrastructure model arranged as a network (e.g., a mesh network). The shortest path first-based isolation trace function may perform shortest-path traces from the location (in this context, referred to as the "starting element") to each source. For each successful shortest-path trace finding one or more switchable elements, the first switchable element encountered on the path of the trace is added to a solution set, and marked as active to prevent further traversal in subsequent shortest-path traces. When all the shortest-path traces are complete, the solution set may be returned as a result. If no switchable element is found on a path of one of the shortest-path traces, it may be concluded that the location (starting element) cannot be isolated and such conclusion returned as the result instead of the solution set.

A shortest path first-based isolation trace may provide a number of advantages over traditional methodologies for performing an isolation trace on an infrastructure model arranged as a network (e.g., a mesh network). For example, it may produce a more optimal solution in various configurations. A more optimal solution may include fewer switchable elements and/or switchable elements that are clustered closer together (e.g., near the location/starting element). This may reduce worker time actuating devices (e.g., in a digital twin use-case), reduce computational resources consumed (e.g., in a BIM simulation use case), and/or provide other benefits.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 2:
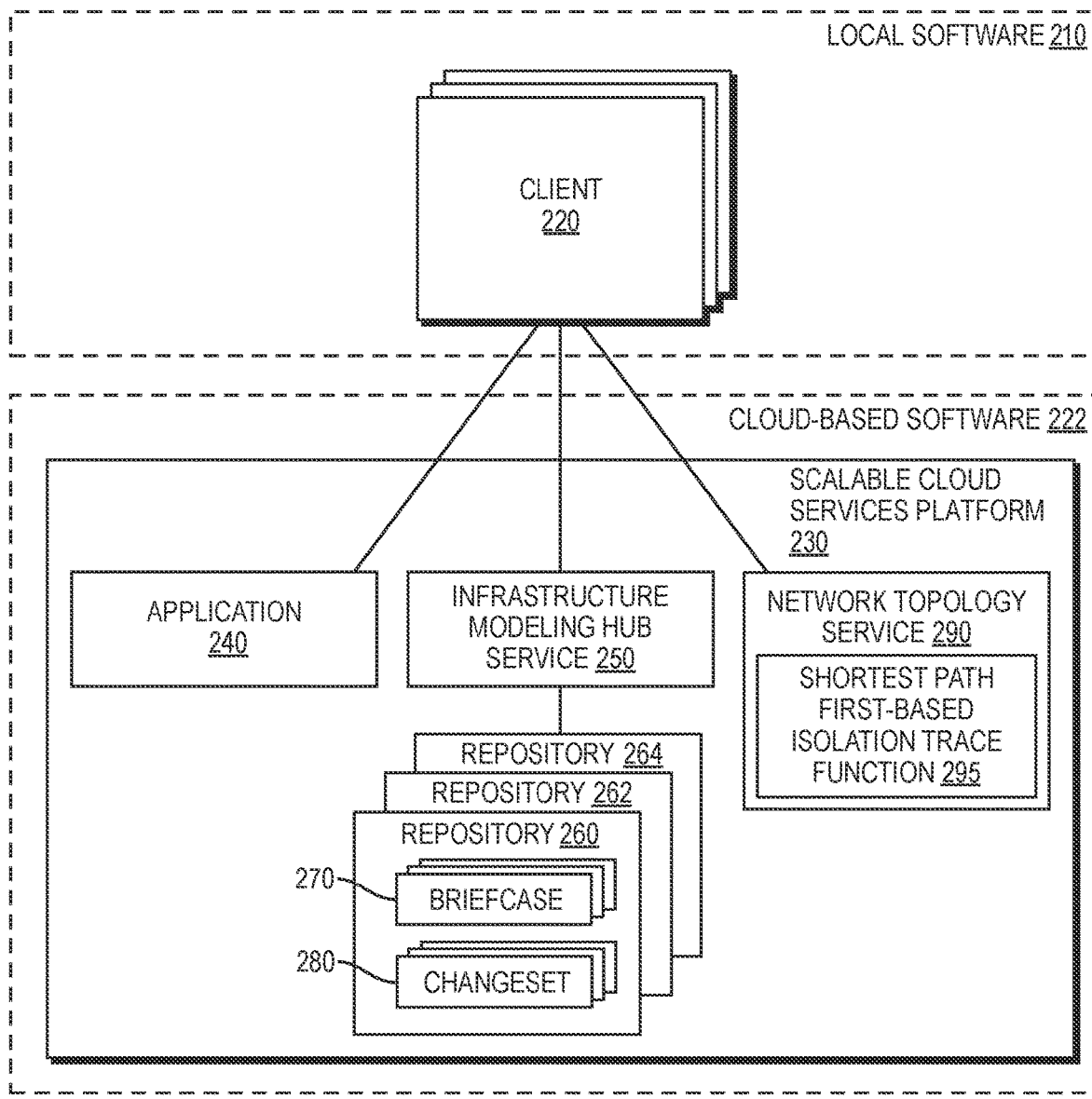
FIG. 2 is a high-level block diagram of at least a portion of an example software architecture that may include a shortest path first-based isolation trace function.

FIG. 2 is a high-level block diagram of at least a portion of an example software architecture that may include a shortest path first-based isolation trace function. The architecture may be divided into client-side software 210 executing on one or more computing devices arranged locally (collectively "client devices"), and cloud-based services software 212 executing on one or more remote computing devices ("cloud computing devices") accessible over the Internet. Each computing device may include processors, memory/storage, a display screen, and/or other hardware (not shown) for executing software, storing data and/or displaying information. The client-side software 210 may include client software applications (or simply "clients") 220 operated by users. The clients 220 may be of various types, including desktop clients that operate directly under an operating system of a client device and web-based clients that operate within a web browser. The clients 220 may be concerned mainly with providing user interfaces and interacting with the application program interfaces (APIs) of cloud-based applications that perform more computing resource intensive tasks.

The cloud-based software 212 may include a scalable cloud platform (e.g., an iTwin® platform) 230 that provide application program interfaces (APIs) and services to support server based software applications (or simply "applications") 240 that interact with the clients 220 to enable users to create, modify, analyze, simulate and/or otherwise interact with infrastructure models (e.g., iModel® models). Some infrastructure models may be arranged as a network (e.g., a mesh network) having elements connected by links, for instance, a model of a utility system such as an electrical grid, water distribution system, wastewater collection system, petroleum distribution system, communications system, etc. The elements may include sources that provides a quality (e.g., electricity, water, petroleum, communications data flow, etc.) and the elements may include switchable elements (e.g., switches, valves, etc.) that can be opened or closed to prevent traversal of the quality.

The scalable cloud platform (e.g., an iTwin® platform) 230 may include an infrastructure modeling hub service (e.g., an iModelHub™ service) 250 that functions as a control center for infrastructure models, coordinating concurrent access and changes resulting in different versions. Version control may be handled through the use of briefcases and changesets. As used herein, a "briefcase" is a particular instance of a database that represents a materialized view of the information of a specific version. A "changeset" is a persistent electronic record that capture changes needed to transform a particular instance from one version to a new version. Initially an "empty" baseline briefcase may be programmatically created. Over time the baseline briefcase may be modified with changesets. Infrastructure modeling hub service 250 may maintain briefcases 270 and a set of accepted changesets 280 (i.e. changesets that have been successfully pushed) in a repository 260-264. When an application 240 interacting with a client 220 desires to operate upon an infrastructure model (e.g., an infrastructure model arranged as a network) they may obtain the briefcase 270 from a repository 260-264 closest to the desired state, and those accepted changesets 270 from the repository 260-264 that when applied bring that briefcase up to the desired state. To avoid the need to constantly access the repositories 260-264, a local copy may be maintained. When an application 240/client 220 makes a change it may create a local changeset. At this stage, the local changeset represents pending changes to the infrastructure model. Subsequently, local changeset may be pushed back to infrastructure model hub services 250 to be added to the set of accepted changesets 280 in a repository 260-264.

The application 240/client 220 and infrastructure modeling hub service (e.g., iModelHub™ service) 250 may interact with a number of other services of the scalable cloud services platform 230 that support aspects of creating, modifying, analyzing and/or simulating infrastructure models, including infrastructure models arranged as networks (e.g., a mesh networks). One such service is a network topology service 290 which support functions related to the arrangement of elements in a network, including an shortest path first-based isolation trace function 295 that may be used to determine which switchable elements may stop flow of a quality (e.g., electricity, water, petroleum, communications data flow, etc.) to a location (e.g., a starting element) an infrastructure model arranged as a network (e.g., a mesh network). The application 240/client 220 may call the network topology service 290, or more specifically the shortest path first-based isolation trace function 295 thereof, to support various features, for example, an outage planner feature that allows a user to observe a portion of a network that will experience a service outage if switchable elements are closed to isolate a location.

The shortest path first-based isolation trace function 295 may implement an improved technique for determining which switchable elements to close. In general, the shortest path first-based isolation trace function 295 may perform shortest-path traces from the location (in this context, referred to as the "starting element") to each source. For each successful shortest-path trace finding one or more switchable elements, the first switchable element encountered on the path of the trace is added to a solution set, and marked as active to prevent further traversal in subsequent shortest-path traces. When all the shortest-path traces are complete, the solution set may be returned as a result. If no switchable element is found on a path of one of the shortest-path traces, it may be concluded that the location (starting element) cannot be isolated and such conclusion returned as the result instead of the solution set.

Figure 3:
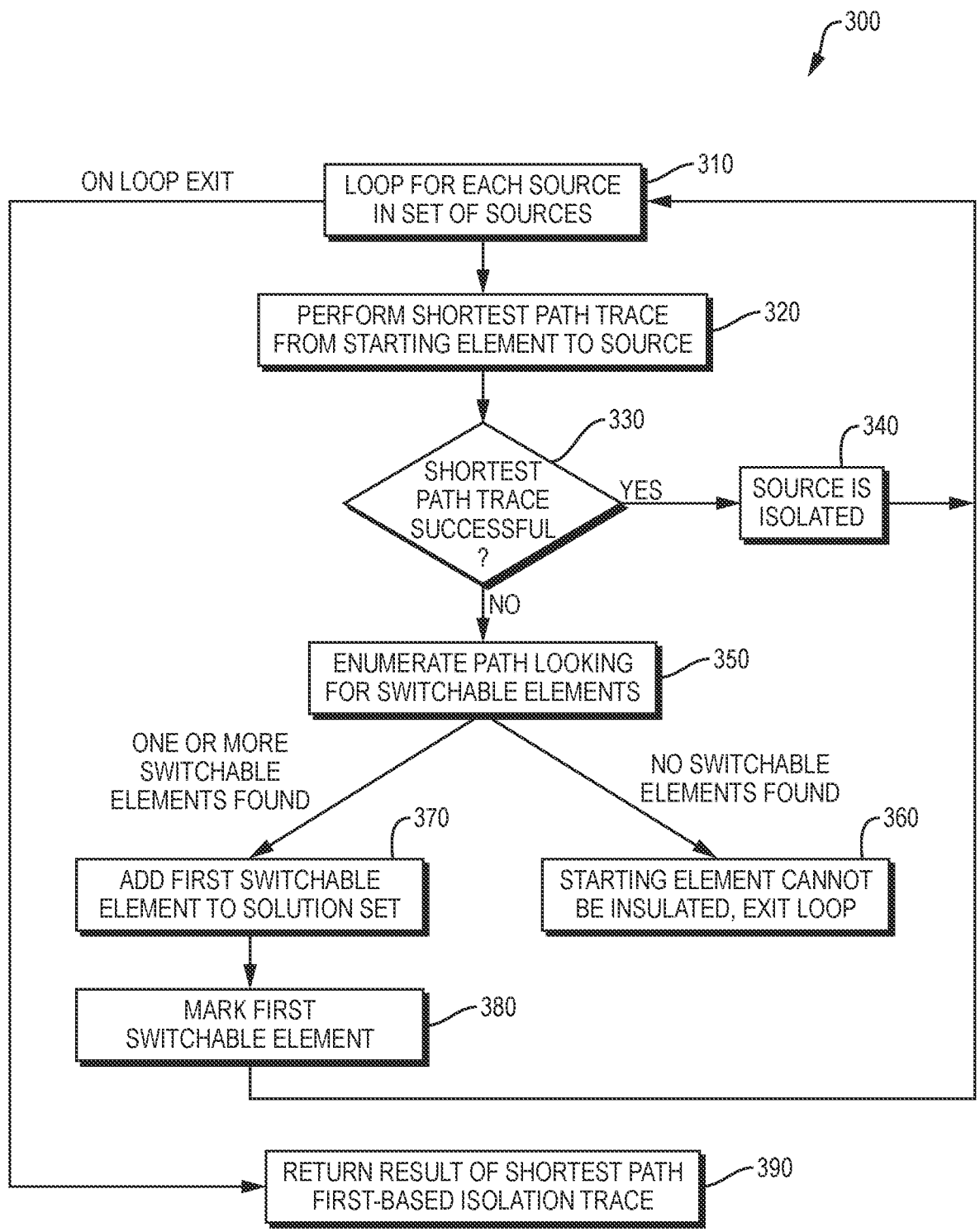
FIG. 3 is a flow diagram of an example sequence of steps for performing a shortest path first-based isolation trace that may be implemented by the shortest path first-based isolation trace function.

FIG. 3 is a flow diagram of an example sequence of steps 300 for performing a shortest path first-based isolation trace that may be implemented by the shortest path first-based isolation trace function 295. The sequence of steps 300 assumes that the infrastructure model arranged as a network (e.g., a mesh network) includes a set of sources (e.g., one or more sources) to be isolated from, a set of switchable elements (e.g., one or more switchable elements) that may be opened or closed to prevent traversal of a quality, and a location (a starting element) that is desired to be isolated from the quality. At step 310, a loop is performed for each source in the set of sources, adding results to an initially-empty solution set on each iteration. In the loop, at sub-step 320, a shortest path trace is performed from the location (starting element) to the selected source.

At sub-step 330, a determination is made whether the shortest-path trace to the selected source is successful. At sub-step 340, if the shortest-path trace is not successful, the selected source is considered to be isolated, and execution reverts to step 310 and the loop performed for the next source in the set of sources (if any remain).

At sub-step 350, if the shortest-path trace is successful, the path enumerated by the shortest-path trace is examined looking for switchable elements. If no switchable element is found on the path, at sub-step 360, it is concluded that the location (starting element) cannot be isolated, and the loop is exited with execution proceeding to step 390. If one or more switchable elements are found on the path, at sub-step 370, a first-encountered switchable element of the one or more switchable elements on the path (e.g., the switchable element nearest the location (starting element) in terms of links traversed) is added to the solution set. Further, at sub-step 380, the first-encountered switchable element is marked (e.g., with an active flag) to prevent its traversal in subsequent shortest path traces. Execution then reverts to step 310, and the loop performed for the next source in the set of sources (if any remain).

At step 390, after all sources in the set of sources have been processes in the loop, or the loop is exited via step sub-step 360, the shortest path first-based isolation trace function 295 returns a result. The result includes either the solution set of switchable elements to be used to isolate the location (starting element) or a conclusion that the location (starting element) cannot be isolated. The returned result may be displayed via the user interface of the client 220, stored to memory/storage of one or more computing devices by the application 240/client 22 for later use or display, or otherwise utilized.

A shortest path first-based isolation trace may produce a more optimal solution than traditional methodologies for performing an isolation trace on an infrastructure model arranged as a network (e.g., a mesh network), for example a depth first traversal-based isolation trace, including solutions with fewer switchable elements and/or switchable elements that are clustered closer together (e.g., near the location/starting element).

Figure 1A:
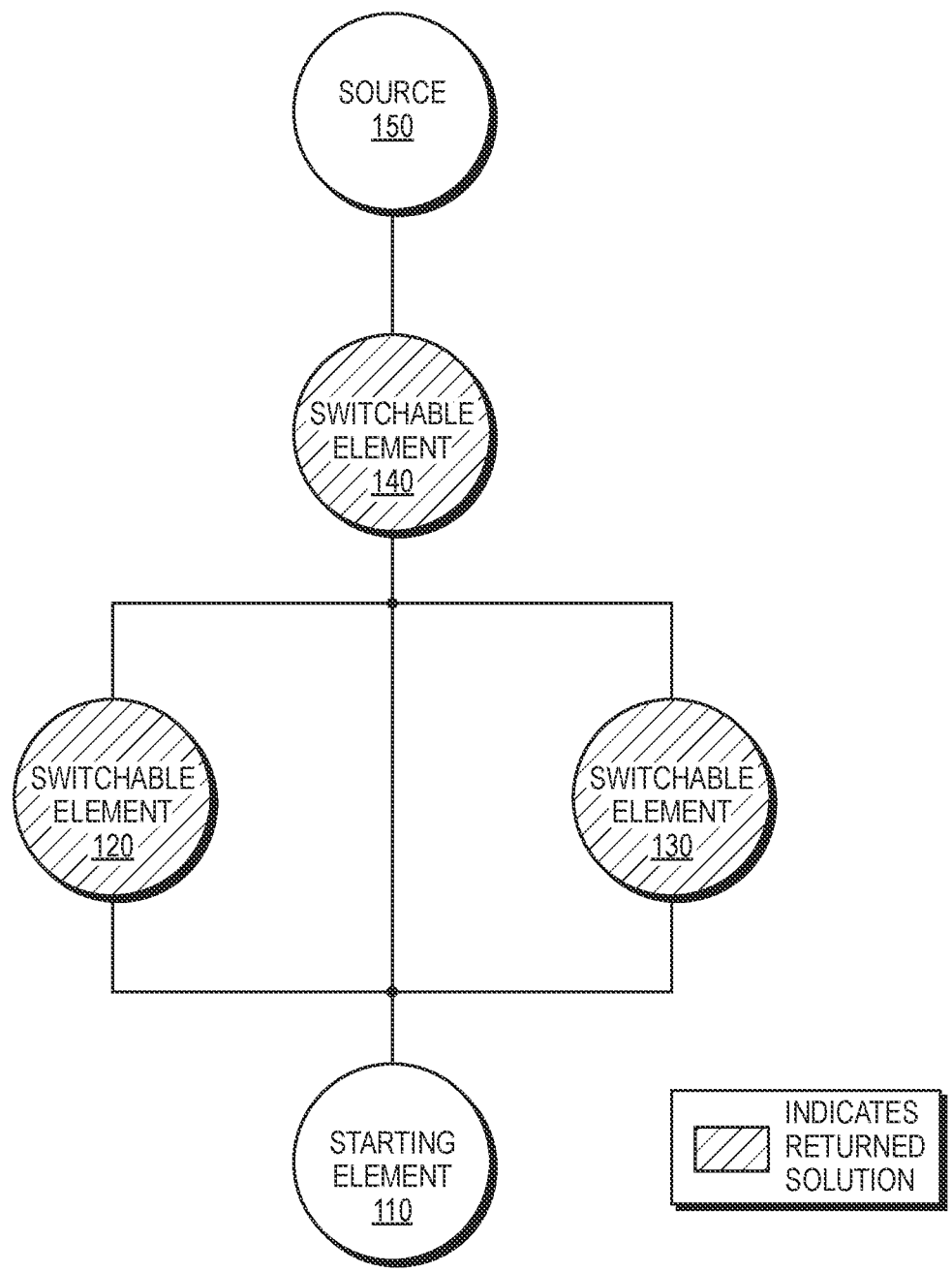
FIG. 1A is an illustration of results of a depth first traversal-based isolation trace in an example infrastructure model arranged as a network (e.g., a mesh network)
Figure 1B:
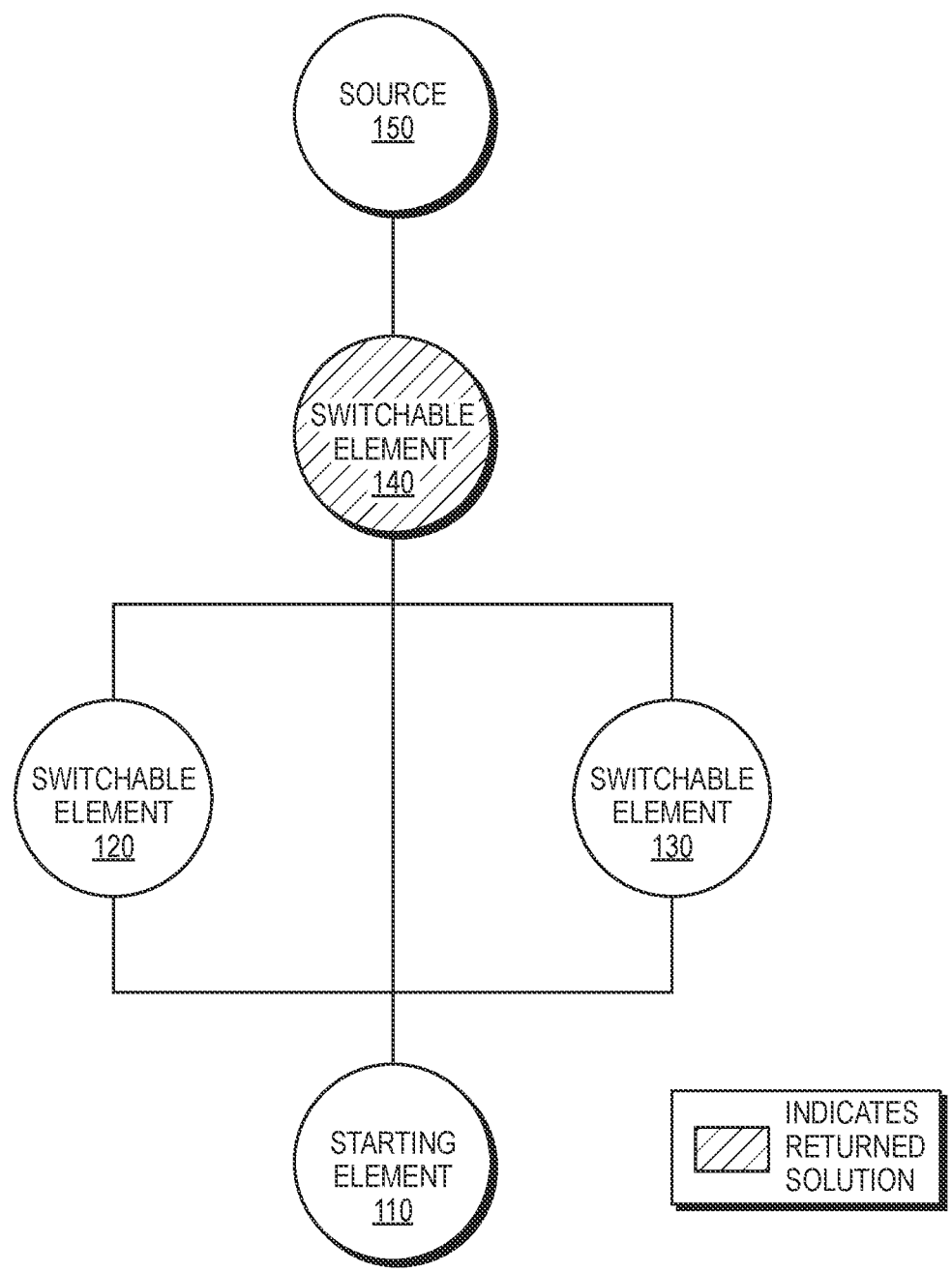
FIG. 1B is an illustration of results of a shortest path first-based isolation trace for the same example infrastructure model as FIG. 1A.

FIG. 1B is an illustration of results of a shortest path first-based isolation trace for the same example infrastructure model as FIG. 1A. The location desired to be isolated is node 110 from a quality flowing from source 150. By execution the sequence of steps 300 of FIG. 3, the shortest path first-based isolation trace may return a result of just switchable element 140 (as opposed to switchable elements 120, 130, 140 that may be returned by a traditional depth first traversal-based isolation trace.

Figure 4A:
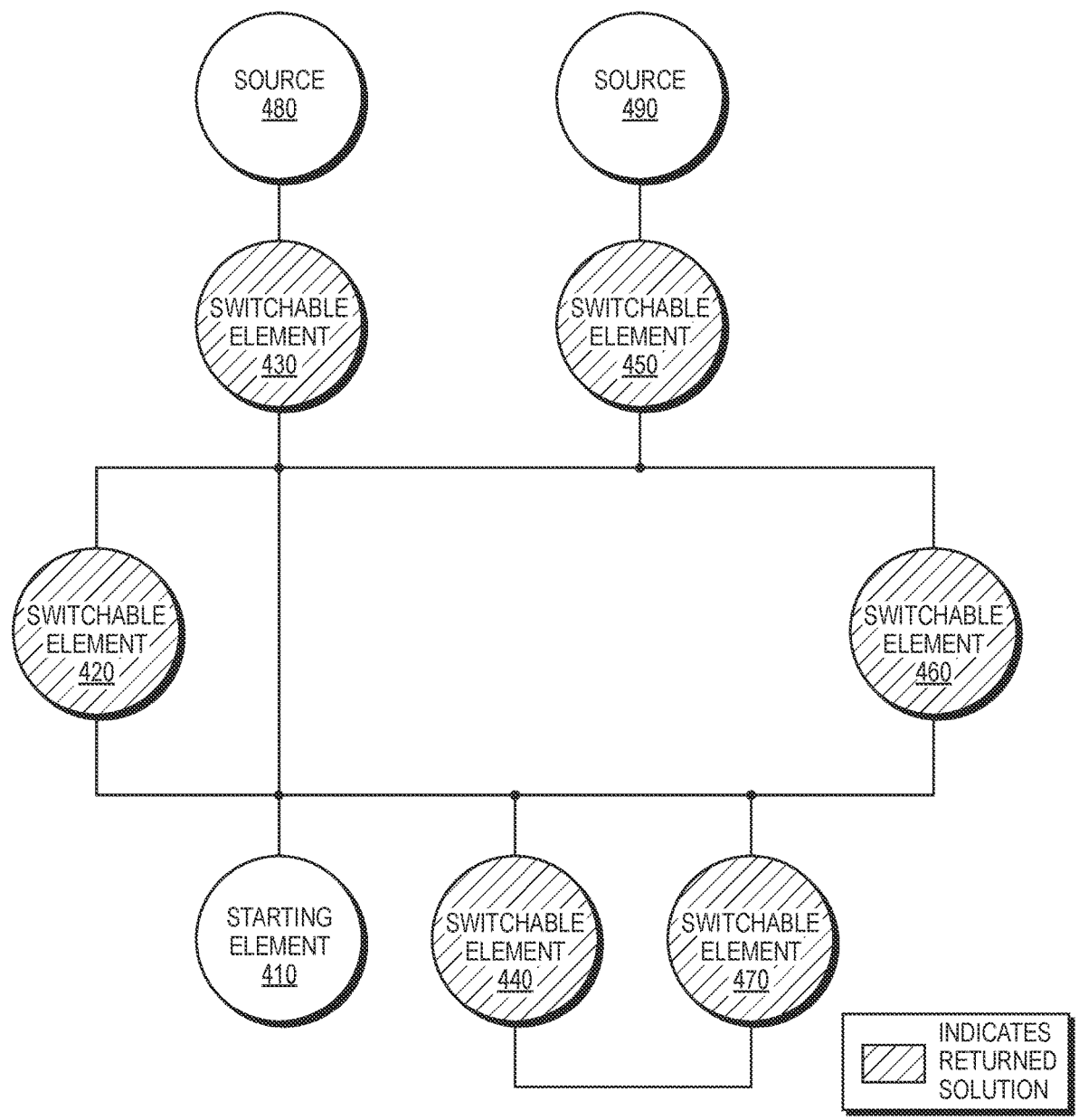
FIG. 4A is an illustration of results of a depth first traversal-based isolation trace in another example infrastructure model arranged as a network (e.g., a mesh network)
Figure 4B:
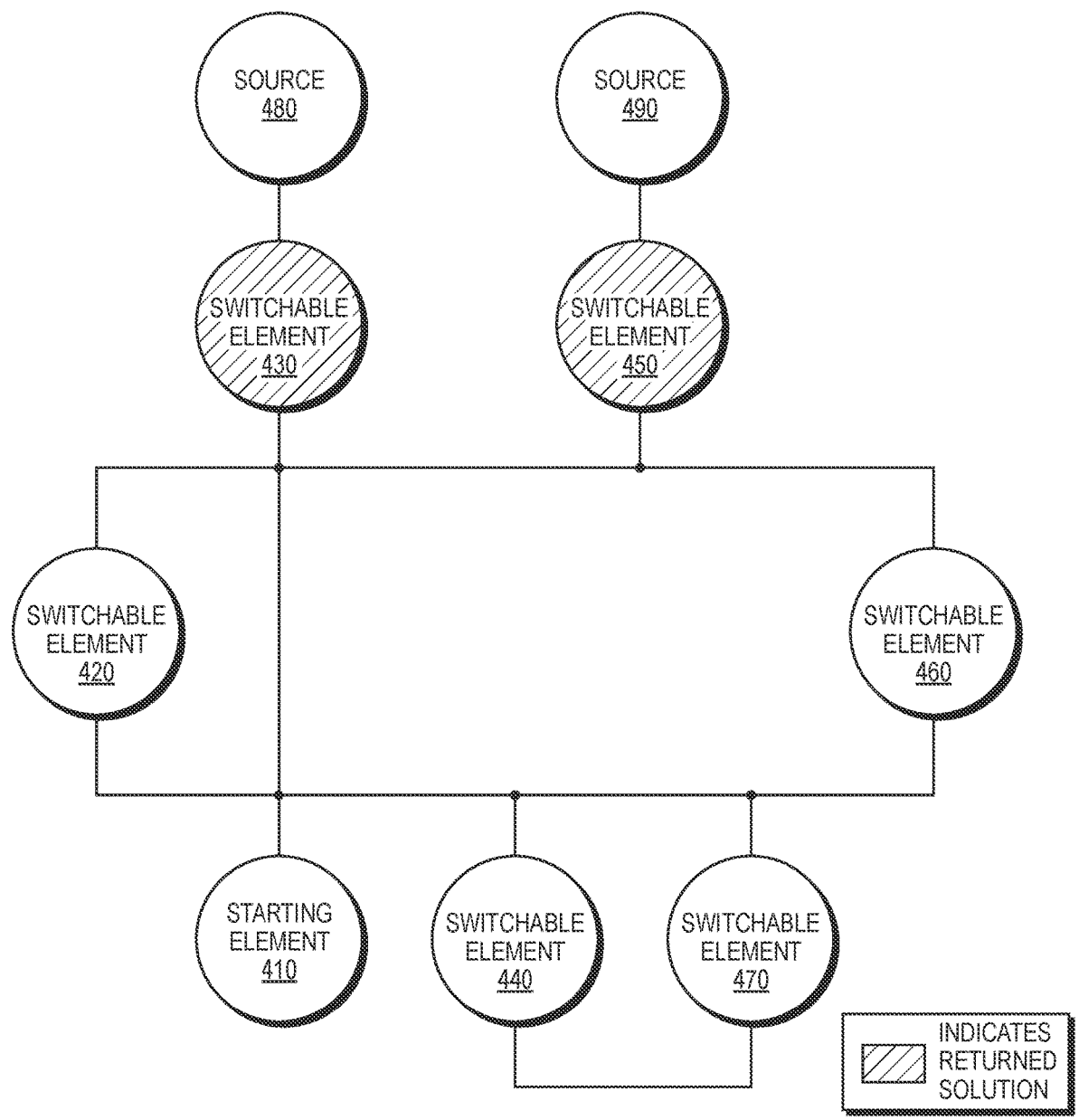
FIG. 4B is an illustration of results of a shortest path first-based isolation trace for the same example infrastructure model as FIG. 4A.

In further example, FIG. 4A is an illustration of results of a traditional depth first traversal-based isolation trace in another example infrastructure model arranged as a network (e.g., a mesh network). In this example, the location to isolate is node 410 from a quality flowing from sources 480, 490. A depth first traversal-based isolation trace may return a sub-optimal result of all the switchable elements 420-470. FIG. 4B is an illustration of results of a shortest path first-based isolation trace for the same example infrastructure model as FIG. 4A. By execution the sequence of steps 300 of FIG. 3, the shortest path first-based isolation trace may return a result of just switchable element 430 and switchable element 450.

Figure 5A:
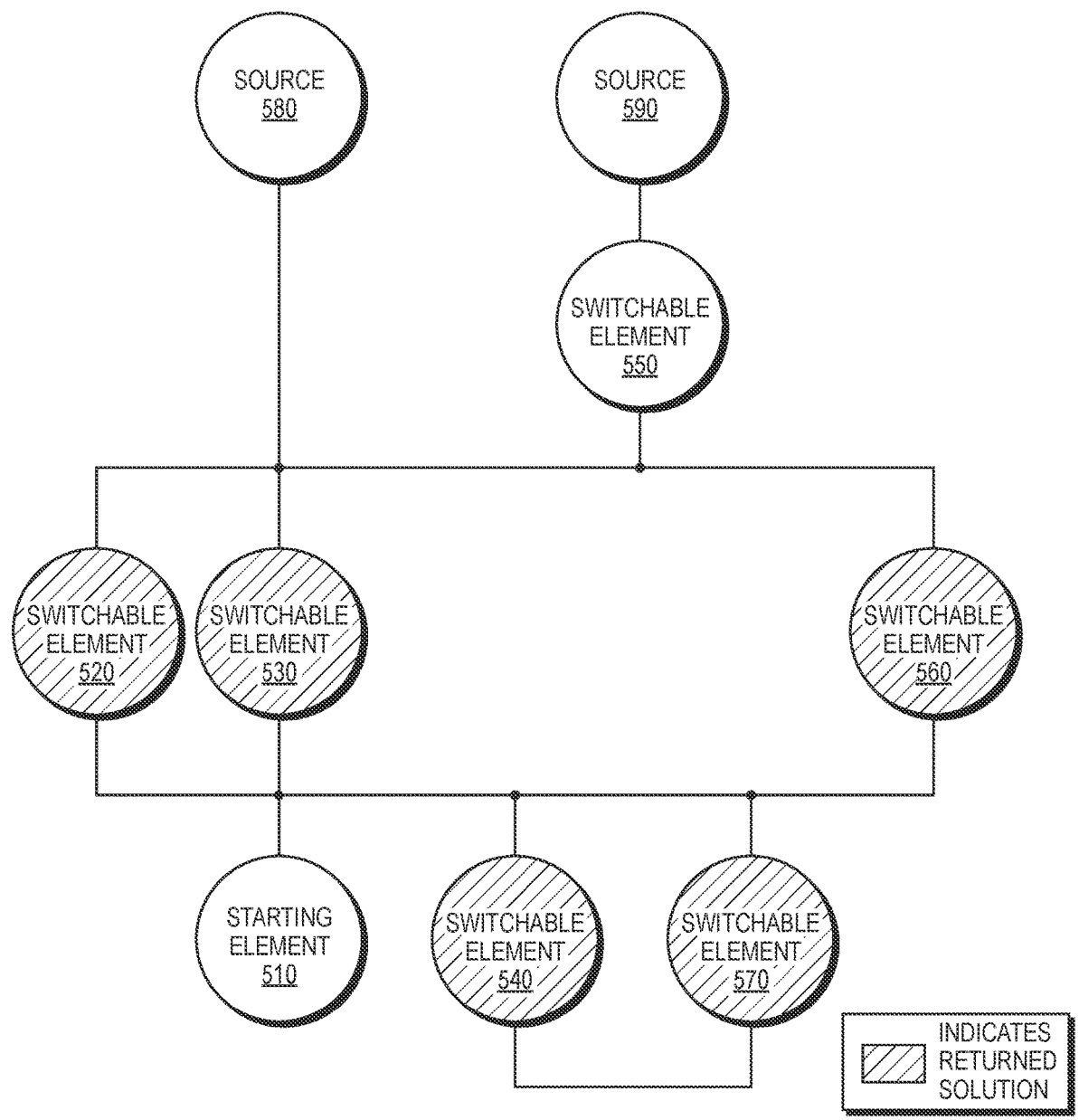
FIG. 5A is an illustration of results of a depth first traversal-based isolation trace in another example infrastructure model arranged as a network (e.g., a mesh network)
Figure 5B:
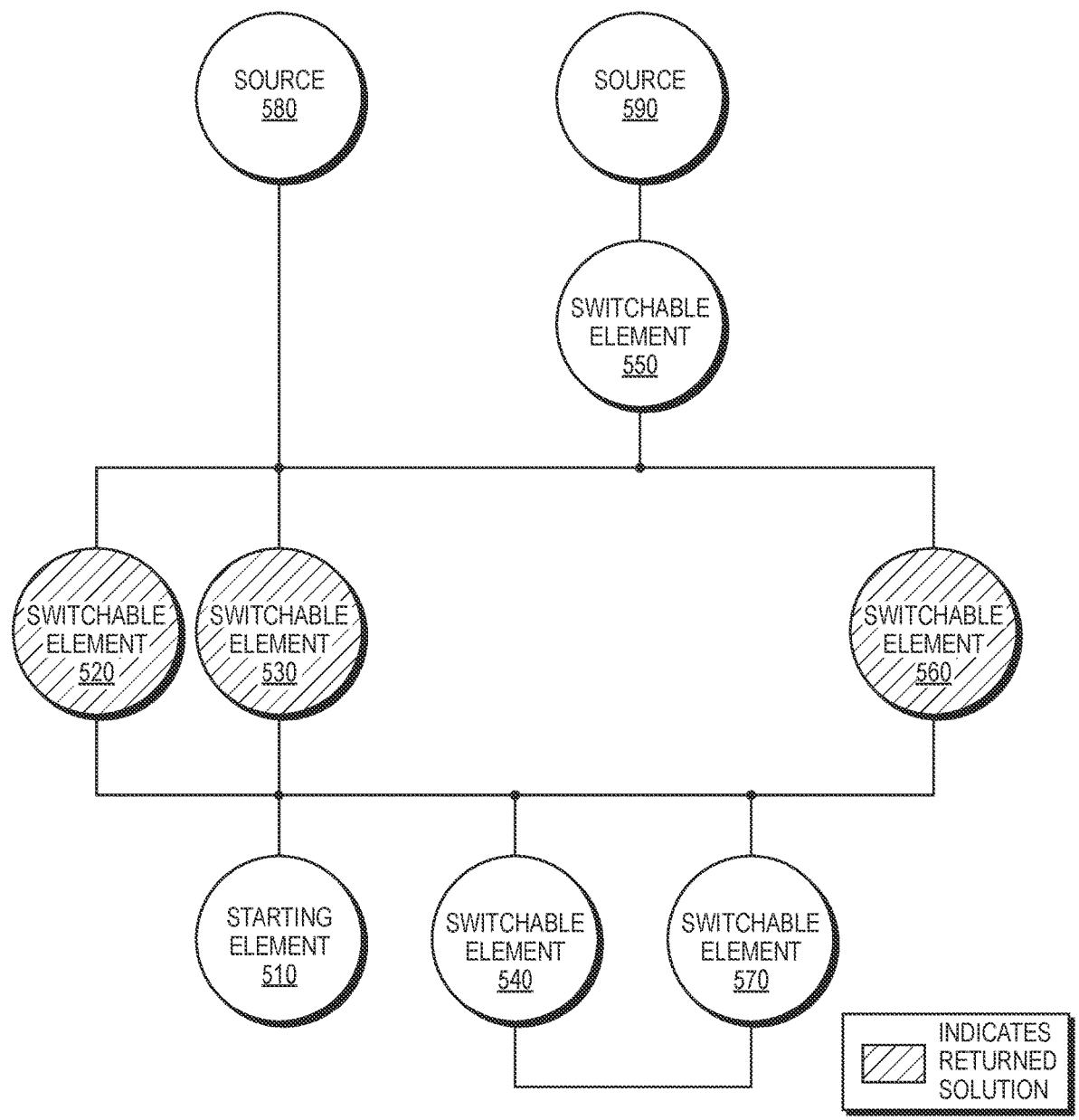
FIG. 5B is an illustration of results of a shortest path first-based isolation trace for the same example infrastructure model as FIG. 5A.

In further example, FIG. 5A is an illustration of results of a depth first traversal-based isolation trace in another example infrastructure model arranged as a network (e.g., a mesh network). In this example, the location to isolate is node 510 from a quality flowing from sources 580 and 590. A depth first traversal-based isolation trace may return a sub-optimal result of the switchable elements 520-540 and 560-570. FIG. 5B is an illustration of results of a shortest path first-based isolation trace for the same example infrastructure model as FIG. 5A. By execution the sequence of steps 300 of FIG. 3, the shortest path first-based isolation trace may return a result of just switchable element 520, switchable element 530 and switchable element 560.

Figure 6A:
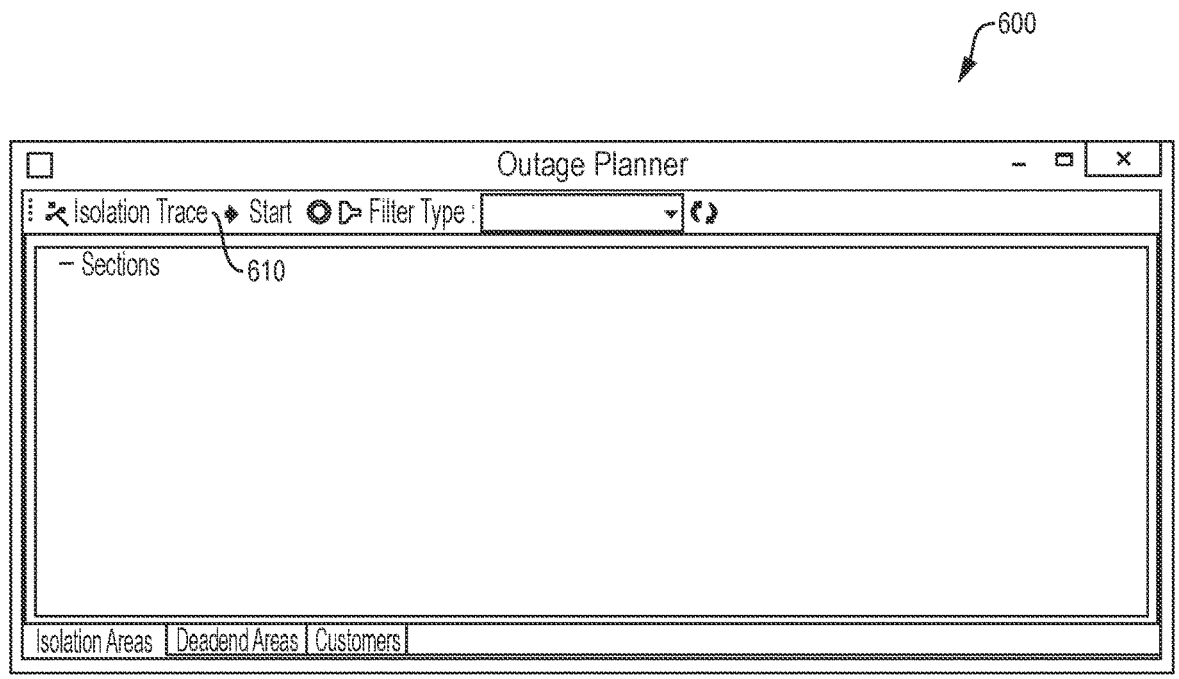
FIG. 6A is an initial window of an outage planner that may use a shortest path first-based isolation trace that can be accessed in the user interface of a client of the software architecture of FIG. 2.
Figure 6B:
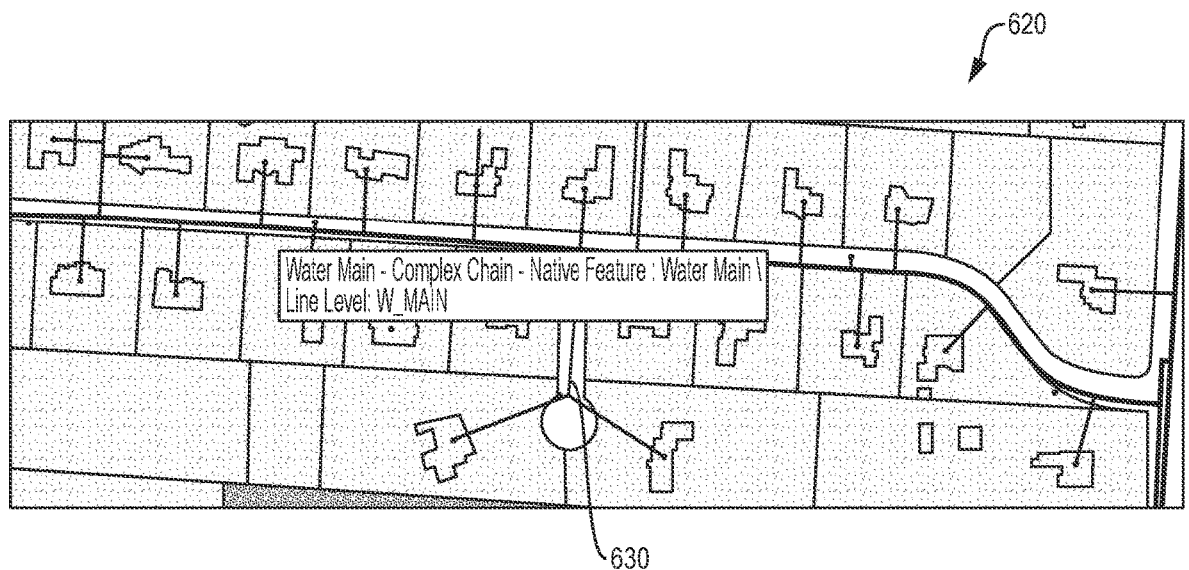
FIG. 6B is a view of a portion of an infrastructure model arranged as a network that may be shown in the user interface of the client.
Figure 6C:
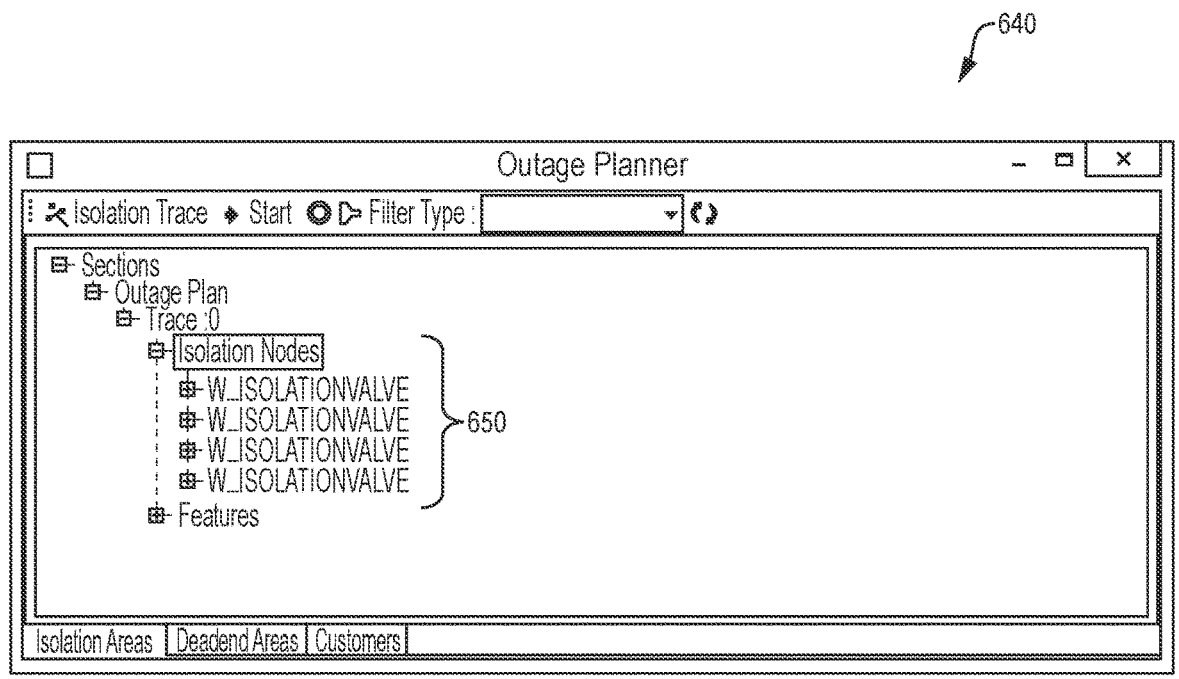
FIG. 6C is an updated window of the outage planner with results that may be shown in the user interface of the client.
Figure 6D:
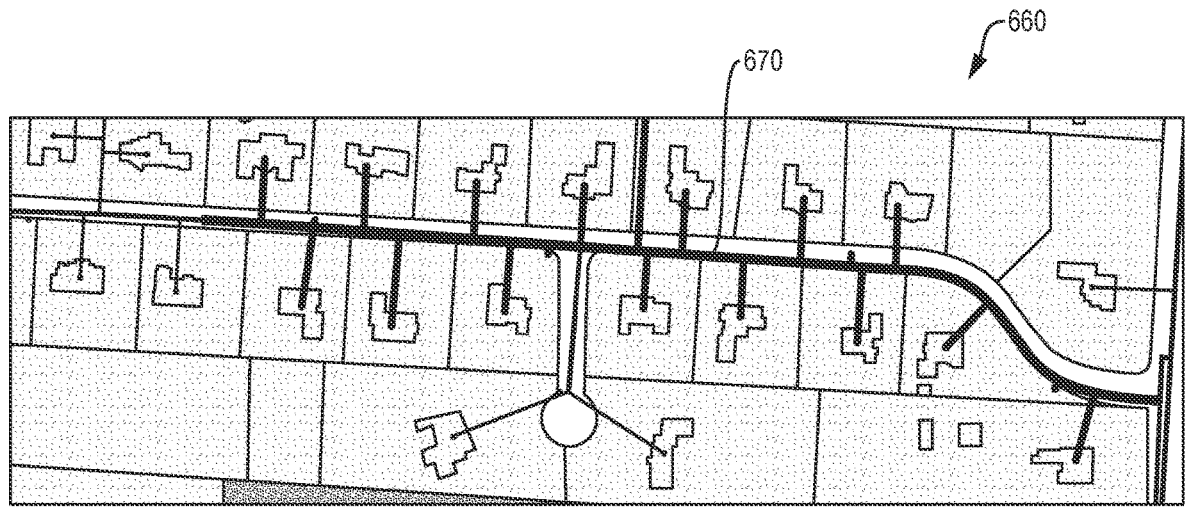
FIG. 6D is an updated view of the portion of an infrastructure model from FIG. 6B graphically showing results.

As mentioned above, the shortest path first-based isolation trace function 295 may be called by the application 240/client 220 to support various features, for example an outage planner feature. FIG. 6A is an initial window 600 of an outage planner that may use a shortest path first-based isolation trace that can be accessed in the user interface of a client 220 of the software architecture of FIG. 2. The shortest path first-based isolation trace may be selected via a button 610. FIG. 6B is a view 620 of a portion of an infrastructure model arranged as a network that may be shown in the user interface of the client 220. A user may select a location (e.g., starting element) 630 that is desired to be isolated by clicking on an element. Thereafter the shortest path first-based isolation trace may be called and executed. FIG. 6C is an updated window 640 of the outage planner with results 650 that may be shown in the user interface of the client 220. FIG. 6D is an updated view 660 of the portion of an infrastructure model from FIG. 6B graphically showing results. Here, the switchable elements to be closed and the portion of the network to be isolated is highlighted 670.

It should be understood that various adaptations and modifications may be readily made to what is described above to suit various implementations and environments. While it is discussed above that many aspects of the techniques may be implemented by specific software modules executing on hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for performing a shortest path first-based isolation trace to identify switchable elements to isolate a location from one or more sources in an infrastructure model arranged as a network, comprising:
    performing, by software executing on one or more computing devices, a shortest-path trace from the location to each source of the one or more sources;
    for each successful shortest-path trace finding one or more switchable elements, determining, by the software, a first switchable element encountered on a path of the shortest-path trace, adding only the first switchable element to a solution set, and marking the first switchable element to prevent further traversal in shortest path traces;
    when the location can be isolated, returning, by the software, the solution set as a result of the shortest path first-based isolation trace; and
    displaying the returned result in a user interface or storing the returned result in memory/storage of the one or more computing devices.

2. The method of claim 1, wherein the first switchable element encountered is a switchable element nearest the location in terms of links traversed.

3. The method of claim 1, wherein each switchable element represents a device that may be opened or closed to prevent traversal of a quality, wherein the quality is selected from the group consisting of electricity, water, petroleum, and communications data flow.

4. The method of claim 1, wherein the infrastructure model is a model of a utility network selected from the group consisting of an electrical grid, a water distribution system, a wastewater collection system, a petroleum distribution system and a communications system.

5. The method of claim 1, wherein the network is a mesh network and the one or more sources are a plurality of sources.

6. The method of claim 1, wherein the software is a shortest path first-based isolation trace function of a cloud-based network topology service that is called by an application and/or client.

7. A method for performing a shortest path first-based isolation trace to identify switchable elements to isolate a location from one or more sources in an infrastructure model arranged as a network, comprising:
    performing, by software executing on one or more computing devices, a shortest-path trace from the location to each source of the one or more sources;
    for each successful shortest-path trace, finding one or more switchable elements, determining, by the software, a first switchable element encountered on a path of the shortest-path trace, adding the first switchable element to a solution set, and marking the first switchable element to prevent further traversal in shortest path traces;
    in response to no switchable element being found on the path of at least one of the shortest-path traces, concluding that the location cannot be isolated;
    when the location cannot be isolated, returning, by the software, the conclusion that the location cannot be isolated as the result of the shortest path first-based isolation trace;
    when the location can be isolated, returning, by the software, the solution set as a result of the shortest path first-based isolation trace; and
    displaying the returned result in a user interface or storing the returned result in memory/storage of the one or more computing devices.

8. The method of claim 7, wherein the first switchable element encountered is a switchable element nearest the location in terms of links traversed.

9. The method of claim 7, wherein each switchable element represents a device that may be opened or closed to prevent traversal of a quality, wherein the quality is selected from the group consisting of electricity, water, petroleum, and communications data flow, and the infrastructure model is a model of a utility network selected from the group consisting of an electrical grid, a water distribution system, a wastewater collection system, a petroleum distribution system and a communications system.

10. The method of claim 7, wherein the network is a mesh network and the one or more sources are a plurality of sources.

11. A method for performing a shortest path first-based isolation trace to identify switchable elements to isolate a location from one or more sources in an infrastructure model arranged as a network, comprising:
    performing, by software executing on one or more computing devices, a shortest-path trace from the location to each source of the one or more sources;
    for each successful shortest-path trace, finding one or more switchable elements, determining, by the software, a first switchable element encountered on a path of the shortest-path trace, adding the first switchable element to a solution set, and marking the first switchable element to prevent further traversal in shortest path traces;

for each unsuccessful shortest-path trace, determining that the source is isolated and proceeding to a next source if any of the one or more sources remain;

when the location can be isolated, returning, by the software, the solution set as a result of the shortest path first-based isolation trace; and displaying the returned result in a user interface or storing the returned result in memory/storage of the one or more computing devices.

12. The method of claim 11, wherein the first switchable element encountered is a switchable element nearest the location in terms of links traversed.

13. The method of claim 11, wherein each switchable element represents a device that may be opened or closed to prevent traversal of a quality, wherein the quality is selected from the group consisting of electricity, water, petroleum, and communications data flow, and the infrastructure model is a model of a utility network selected from the group consisting of an electrical grid, a water distribution system, a wastewater collection system, a petroleum distribution system and a communications system.

14. The method of claim 11, wherein the network is a mesh network and the one or more sources are a plurality of sources.

15. A computing device comprising:
a processor; and
a memory coupled to the processor and configured to store a shortest path first-based isolation trace function that when executed on the processor is configured to isolate a location from one or more sources in an infrastructure model arranged as a network by:
performing a shortest-path trace from a location to each source of the one or more sources,
for each successful shortest-path trace finding one or more switchable elements, determining a first switchable element encountered on a path of the shortest-path trace, adding only the first switchable element to a solution set, and marking the first switchable element to prevent further traversal in shortest path traces, and
when the location can be isolated, returning the solution set as a result of a shortest path first-based isolation trace.

16. A computing device comprising:
a processor; and
a memory coupled to the processor and configured to store a shortest path first-based isolation trace function that when executed on the processor is configured to isolate a location from one or more sources in an infrastructure model arranged as a network by:
performing a shortest-path trace from a location to each source of the one or more sources,
for each successful shortest-path trace, finding one or more switchable elements, determining a first switchable element encountered on a path of the shortest-path trace, adding the first switchable element to a solution set, and marking the first switchable element to prevent further traversal in shortest path traces,
in response to no switchable element being found on the path of at least one of the shortest-path traces, concluding that the location cannot be isolated,
when the location cannot be isolated, returning the conclusion that the location cannot be isolated as the result of the shortest path first-based isolation trace, and when the location can be isolated, returning the solution set as a result of a shortest path first-based isolation trace.

17. A non-transitory computing device readable medium having instructions stored thereon, the instructions when executed by one or more computing devices operable to:
perform a shortest-path trace from a location in an infrastructure model arranged as a network to each of one or more sources in the infrastructure model that provide a quality;
for each successful shortest-path trace, determine a first switchable element encountered on a path of the shortest-path trace, add only the first switchable element to a solution set, and mark the first switchable element to prevent further traversal in shortest path traces;
return the solution set as a result of a shortest path first-based isolation trace; and
display the returned result in a user interface or store the returned result in memory/storage.

18. The non-transitory computing device readable medium of claim 17, wherein the first switchable element encountered is a switchable element nearest the location in terms of links traversed.

19. The non-transitory computing device readable medium of claim 17, wherein the quality is selected from the group consisting of electricity, water, petroleum and communications data flow.

20. The non-transitory computing device readable medium of claim 17, wherein the infrastructure model is a model of a utility network selected from the group consisting of an electrical grid, a water distribution system, a wastewater collection system, a petroleum distribution system and a communications system.

21. The non-transitory computing device readable medium of claim 17, wherein the network is a mesh network and the one or more sources are a plurality of sources.

22. A non-transitory computing device readable medium having instructions stored thereon, the instructions when executed by one or more computing devices operable to:
perform a shortest-path trace from a location in an infrastructure model arranged as a network to each of one or more sources in the infrastructure model that provide a quality;
for each successful shortest-path trace, determine a first switchable element encountered on a path of the shortest-path trace, add the first switchable element to a solution set, and mark the first switchable element to prevent further traversal in shortest path traces;
for each unsuccessful shortest-path trace, determine the source is isolated and proceed to a next source if any of the one or more sources remain;
return the solution set as a result of a shortest path first-based isolation trace;
display the returned result in a user interface or store the returned result in memory/storage.

23. The non-transitory computing device readable medium of claim 22, wherein the first switchable element encountered is a switchable element nearest the location in terms of links traversed.

24. The non-transitory computing device readable medium of claim 22, wherein each switchable element represents a device that may be opened or closed to prevent traversal of a quality, wherein the quality is selected from the group consisting of electricity, water, petroleum, and communications data flow, and the infrastructure model is a model of a utility network selected from the group consisting of an electrical grid, a water distribution system, a wastewater collection system, a petroleum distribution system and a communications system.

25. The non-transitory computing device readable medium of claim 22, wherein the network is a mesh network and the one or more sources are a plurality of sources.

\* \* \* \* \*